July 27, 1965

J. G. LE MEN 3,197,471

3-AMINO STEROID COMPOUNDS AND
PROCESS OF MAKING SAME

Filed April 6, 1962

INVENTOR
JEAN GEORGES LE MEN

BY

AGENT

INVENTOR
JEAN GEORGES LE MEN

BY

AGENT

*INVENTOR*
JEAN GEORGES LE MEN

BY

*AGENT*

United States Patent Office

3,197,471
Patented July 27, 1965

3,197,471
3-AMINO STEROID COMPOUNDS AND PROCESS OF MAKING SAME
Jean Georges Le Men, Paris, France, assignor to Roger Bellon, Neuilly-sur-Seine, Seine, France
Filed Apr. 6, 1962, Ser. No. 185,730
Claims priority, application Great Britain, Oct. 9, 1959, 34,318/59; Mar. 25, 1960, 10,680/60
24 Claims. (Cl. 260—239.57)

The present application is a continuation-in-part of copending application Serial No. 61,163 (now abandoned), filed October 7, 1960, and entitled: "(20 S)-3β-(N-Methylamino)-20-Hydroxy-18-oic Lactone (→20)-pregna-5-ene and Derivatives Thereof," and of copending application Serial No. 170,569, filed February 2, 1962, now U.S. Patent No. 3,137,691, and entitled: "New Alkaloid Derivatives."

The present invention relates to new and valuable 3-amino steroid compounds and more particularly to a new steroid alkaloid obtained from *Paravallaris microphylla* Pitard, derivatives of said alkaloid, and to processes for the preparation of the alkaloid and its derivatives.

The new alkaloid of the present invention corresponds to the Formula I

I in which R represents a hydrogen atom.

Said compound comprises two characteristic groups, namely, a lactone group and a secondary amino group represented by the methylamino group —NHCH₃. It also contains a double bond which can be hydrogenated.

The melting point of the alkaloid is 178° C. (block) and 181° C. (corrected tube).

Figure 1:
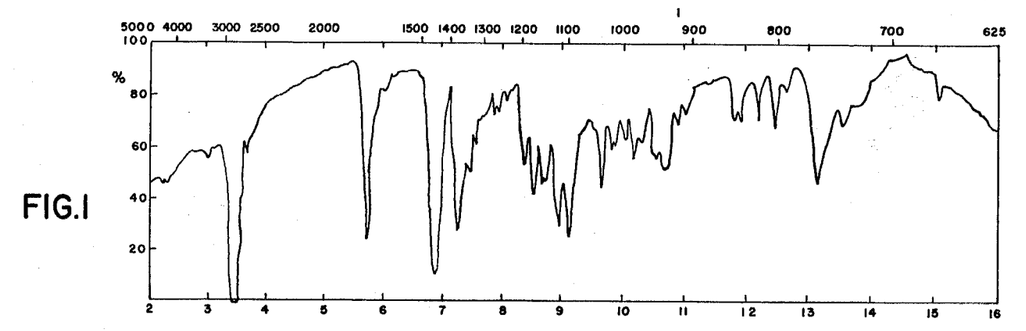

Its infra-red spectrum is shown in FIG. 1 of the drawings; this spectrum has been established, like those given hereinafter, by means of a double-beam Baird apparatus, while the compounds were suspended in "Nujol."

The alkaloid of the present invention will be designated hereinafter as paravallarine or (20 S)-3β-(N-methylamino)-20-hydroxy-18-oic lactone (→20)-pregna-5-ene, following the rules of nomenclature established by Cahn, Ingold, and Prelog (Experientia, 12, 81, 1956). It has the following specific rotation values: $[\alpha]_D^{20} = -36°$ (conc.=0.5% in ethanol at 96° C.); $[\alpha]_D^{20} = -54.6°$ (conc.=0.32% in chloroform).

The present invention also relates to derivatives of said secondary amino compound of Formula I wherein R is an alkyl, aryl, aralkyl, or heterocyclic radical, preferably a lower alkyl radical or a benzyl radical. When R is a methyl radical, the N-methyl paravallarine, or (20 S)-3β-(N-dimethylamino)-20-hydroxy-18-oic lactone (→20)-pregna-5-ene is obtained.

Figure 2:
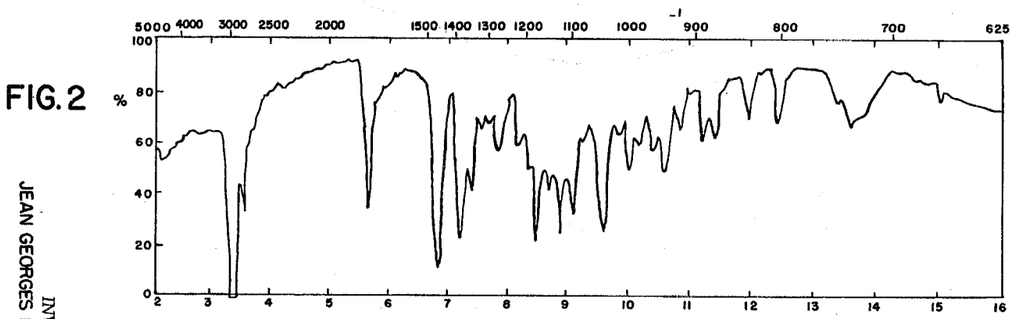

This N-methyl derivative has a melting point of 258° C. and an infra-red spectrum which is given in FIG. 2 of the drawings. It has a specific rotation of $[\alpha]_D^{20} = -37.7°$ (conc.=0.40% in chloroform).

Other derivatives of said secondary amino compound of Formula I which are obtained according to the present invention are the N-acylated compounds wherein R is an acyl group. The N-acetyl derivative wherein R represents the acetyl radical is designated as N-acetyl paravallarine, or (20 S)-3β-(N-methyl-N-acetylamino)-20-hydroxy-18-oic lactone (→20)-pregna-5-ene.

Figure 3:
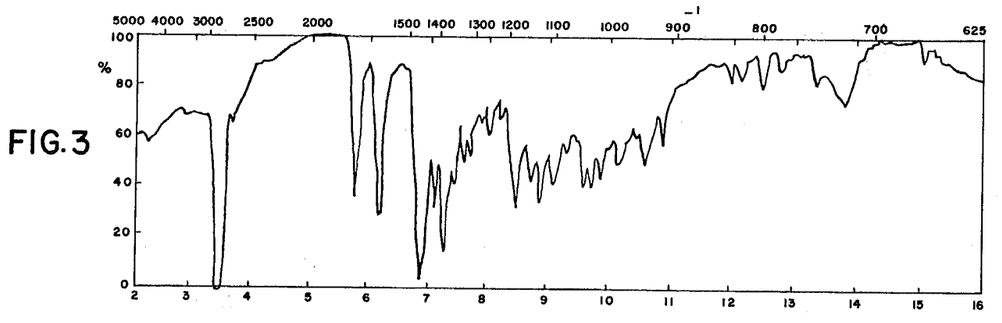

The infra-red spectrum of this N-acetyl derivative is given in FIG. 3 of the drawings. It is evident that this spectrum includes the characteristic band of an acid amide group at 6.15 microns; the specific rotation of this N-acetylated derivative is $[\alpha]_D^{20} = -45.4°$ (conc.=0.31% in chloroform). Other N-acyl derivatives are those having acyl group of an aliphatic acid, an aromatic acid, a cycloaliphatic acid, or a heterocyclic acid such as propionic acid, n-butyric acid, cyclopentyl propionic acid, benzoic acid, stearic acid, hexahydrobenzoic acid, caproic acid, enanthoic acid, and others.

On treating the alkaloid paravallarine with hydrochloric acid, the hydrochloride is obtained by the addition of one molecule of hydrochloric acid to the nitrogen atom of paravallarine. The hydrochloride has a melting point between 295° C., and 298° C. (block). Its specific rotation is $[\alpha]_D^{20} = -25.2°$ (conc.=0.74% in chloroform).

Figure 4:
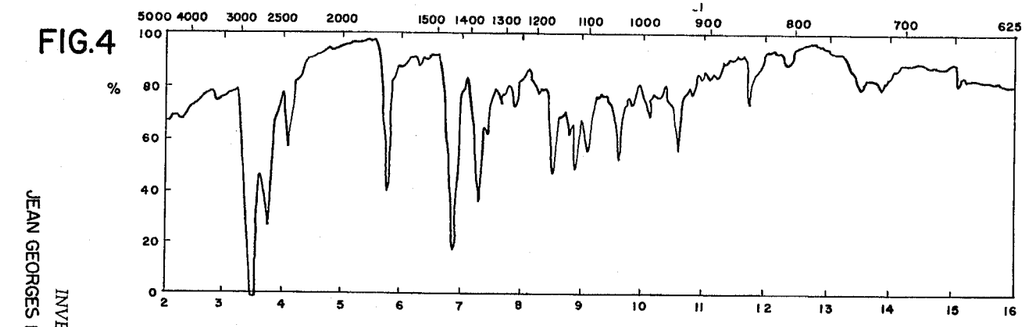

Its infra-red spectrum is also illustrated in FIG. 4 of the drawings, wherein the characteristic band of the acid addition salt of a secondary amine is noticeable.

When opening the lactone ring of paravallarine with simultaneous hydrogenation, the alcohol designated as paravallarinol or (20 S)-3β-(N-methylamino)-18,20-dihydroxy pregna-5-ene, of the following Formula II is obtained:

II wherein R₄, R₅, and R₆ represent hydrogen.

Figure 5:
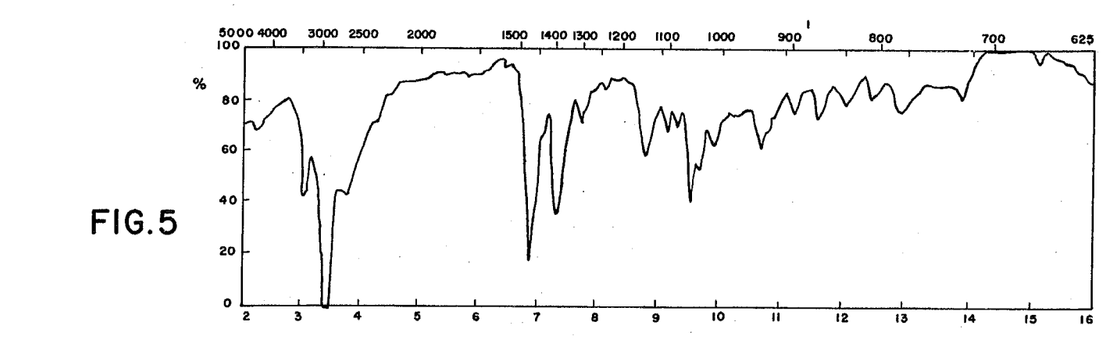

Paravallarinol melts at a temperature of 241–242° C. (block); its specific rotation is $[\alpha]_D^{20} = -47.5°$ (conc.= 0.24% in chloroform). The infra-red spectrum of this compound is given in FIG. 5 of the drawings. It shows the characteristic bands of the hydroxyl group and the amino group between 3 microns and 4 microns.

Triacetyl paravallarinol or (20 S)-3β-N-methyl-N-acetylamino-18,20-diacetoxy pregna-5-ene (R₄, R₅, and R₆ of the above given formula of the alcohol representing acetyl groups) is prepared by acetylation of paravallarinol.

The melting point of this product is 134° C. (block); its specific rotation is $[\alpha]_D^{20} = \pm 0$ (conc.=0.19% in chloroform).

Figure 6:
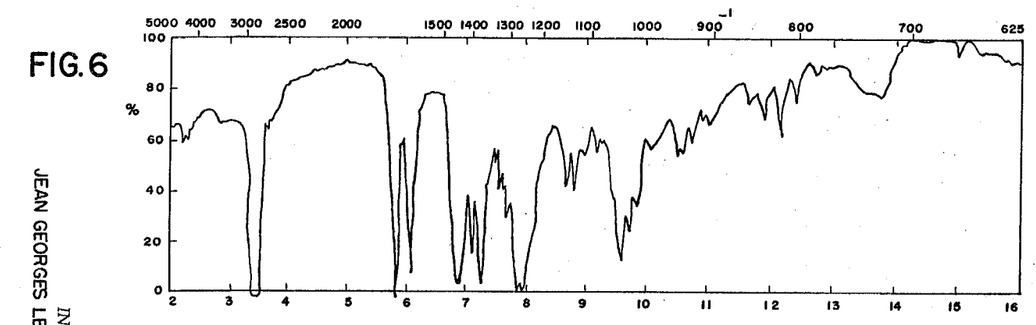

The infra-red spectrum of this compound is given in FIG. 6 of the drawings.

After saponifying N-acetyl paravallarine in an alcoholic medium, the resulting solution is diluted and acidified, and the alcohol used as solvent is distilled off. Thereby, N-acetyl paravallaric acid is precipitated.

Figure 7:
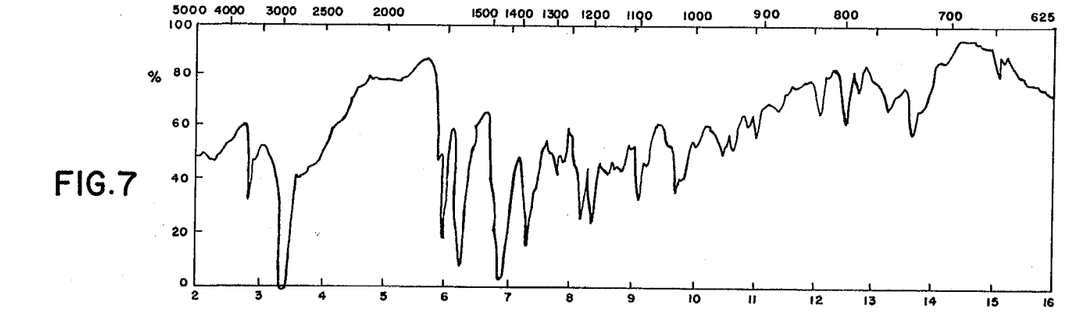

The infra-red spectrum of this acid is given in FIG. 7 of the accompanying drawings.

Figure 8:
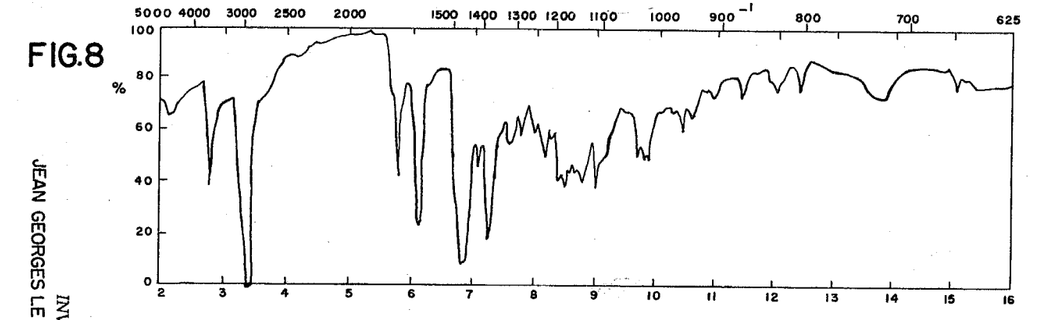

This acid can be esterified to yield the methyl ester, or (20 S)-3β-(N-methyl-N-acetylamino)-13-carbomethoxy-20-hydroxy pregna-5-ene of Formula III:

The melting point of this ester is 223° C. and its infra-red spectrum is shown in FIG. 8 of the drawings. This spectrum comprises a band which is characteristic for a hydroxyl group at 2.8 microns and a band which is characteristic for a carboxylic acid ester group at 5.78 microns. The specific rotation of this ester is $[\alpha]_D^{20}=+23.8°$ (conc.=0.21% in chloroform).

Other derivatives of paravallarine have also been prepared and, in particular, N-methyl-paravallarinol or (20 S)-3β-(N-dimethylamino)-18,20-dihydroxy pregna-5-ene of the following Formula IV:

wherein $R_5$ and $R_6$ represent hydrogen.

The melting point of this compound is 228° C.; its specific rotation is $[\alpha]_D^{20}=-30°\pm 2°$ (chloroform).

Figure 9:
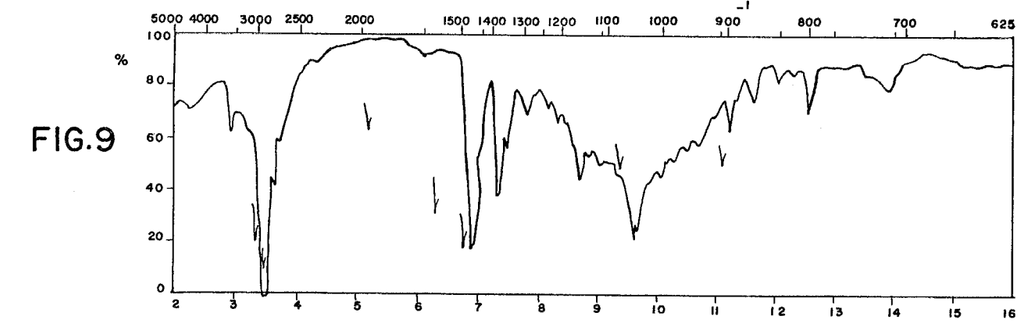

The infra-red spectrum of this compound is shown in FIG. 9 of the drawings. The spectrum shows the band of a hydroxyl group at 2.9μ and a strong absorption between 2.9μ and 4μ, which is due to the associated hydroxyl groups (—OH).

The results of the analysis of the compound corresponding to the empirical formula $C_{23}H_{39}O_2N$ are as follows:

Calculated: percent C=76.40, H=10.87, N=3.87. Found: percent C=77.3, H=10.8, N=4.2.

The diacetyl-N-methyl paravallarinol, or (20 S)-3β-(N-dimethylamino)-18,20-diacetoxy pregna-5-ene, has been prepared in a similar manner; its structural formula corresponds to the above given formula, in which $R_5$ and $R_6$ represent acetyl groups ($CH_3CO$).

Figure 10:
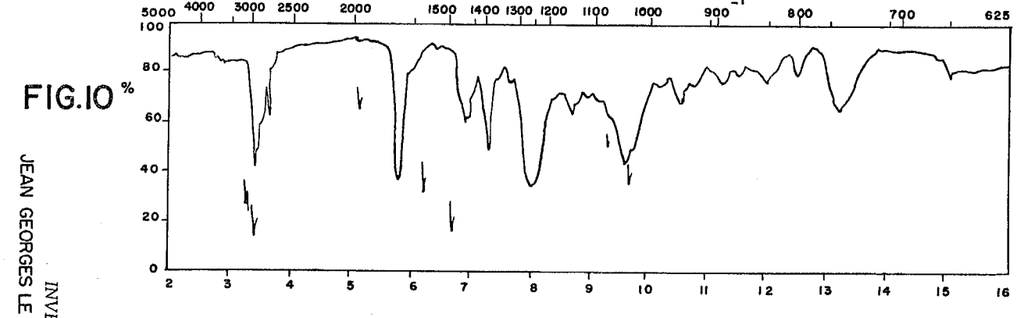

The melting point of this compund is 114° C. and its infra-red spectrum is shown in FIG. 10 of the drawings. This spectrum shows an ester band at 7.75μ. The results of the analysis of this compound of the empirical formula $C_{27}H_{43}O_4N$ are as follows:

Calculated: Percent C=72.77, H=9.73, O=14.36, N=3.14. Found: Percent C=72.5, H=9.7, O=14.7, N=3.4.

Furthefore, paravallarine and some of its derivatives can be hydrogenated catalytically at atmospheric pressure and temperature by dissolving said compounds in glacial acetic acid and introducing hydrogen into the solution in the presence of platinum or palladium in finely divided form; thereby, the double bond in 5,6-position is quantitatively hydrogenated and corresponding dihydrogenated derivatives of the allopregnane or 5α-pregnane series are obtained.

Under such conditions of hydrogenation, the lactone group between the carbon atoms 18 and 20 is not split up, nor is there any reaction with the hydroxyl and acetoxy groups of some derivatives thereof in said positions, and also not with the 18-carbomethoxy group and the 20-hydroxyl group of the methyl ester of N-acetyl paravallaric acid.

Other esters of paravallaric acid of Formula III than the methyl ester may, of course, also be prepared such as other alkyl esters and especially the ethyl ester and other lower alkyl esters, cycloalkyl esters, aryl esters, or aralkyl esters such as the benzyl ester and others.

When using the tertiary amino compounds such as N-methyl paravallarine or the N-acylated paravallarine compounds mentioned hereinabove, the corresponding tertiary amino derivatives of paravallarinol may be obtained by opening the lactone ring with simultaneous hydrogenation.

It is also possible to produce other triacylated paravallarinol compounds than the triacetyl paravallarinol mentioned hereinabove whereby the acyl groups may be derived from aliphatic, cycloaliphatic, aromatic, or heterocyclic acids as mentioned hereinabove.

Likewise, saponification of other N-acyl paravallarine compounds than N-acetyl paravallarine yields various N-acyl paravallaric acid compounds and their esters.

Catalytic hydrogenation of paravallarine, paravallarinol, paravallaric acid, and their N-substituted derivatives, their esters, and the like derivatives yields the corresponding dihydrogenated compounds of the allopregnane or 5α-pregnane series.

Paravallarine and its derivatives are of particular interest as intermediates in the manufacture of steroids. More particularly de-amination of paravallarine and of the above mentioned derivatives with the methylamino group —$NH.CH_3$ in 3-position may be effected to yield 18-oxygenated steroids, and more particularly steroids having a lactone ring between the carbon atoms 18 and 20 of the pregnan-4-ene and allopregnane type.

Furthermore, pharmaco dynamic studies of some of the above mentioned compounds have shown that paravallarine in itself is a product of moderate toxicity. With doses varying between 5 mg./kg. and 50 mg./kg. no substantial action on the male or female reproductive organs or any anti-inflammatory action as produced by cortisone and the like compounds have been observed. Paravallarine increases or decreases diuresis depending on the dosage administered. It is very active on the cardio-vascular system; it causes dilatation of coronary vessels and shows affinity for the myocard. In this last instance, a negative chronotropic action or a positive or negative inotropic action, respectively, are exerted in accordance with the doses used. Paravallarine also modified the electro-cardiogram by disturbing ventricular and auriculo-ventricular conduction, the alterations shown by the diagram obtained are sometimes encountered with compounds of the digitalis type.

The present invention is also concerned with a process for the preparation of paravallarine from *Paravallaris microphylla* Pitard.

According to this process, the leaves, the stems, or the roots of this plant are used as starting material. The plant is reduced to powder; it is treated with a weakly alkaline agent such as an alkali metal carbonate or bicarbonate, or ammonia, at a pH-value exceeding a pH of 7.0 and lower than a pH of 12.0 preferably at a pH of about 9.0; the resulting mixture is extracted by means of a non-alcoholic organic solvent, i.e. by a solvent other than a higher alcohol, which solvent is immiscible with water. The alkaloids enter an aqueous acid phase at a pH between 2.0 and 7.0 and the pH of the separated acid aqueous phase is increased to an alkaline pH-value between 7.0 and 12.0 and preferably to a pH of about 9.0. As a result thereof the alkaloids from the plant are precipitated.

The solvents used for the extraction are preferably hydrocarbons, aliphatic ethers, chlorinated aliphatic hydrocarbons such as methylene chloride, chloroform, and the like.

The precipitated alkaloids can be separated by filtration. It is also possible to extract them with an organic solvent other than a higher alcohol which is immiscible in water. The organic phase obtained thereby is separated by decanting, washed with water, and distilled to yield all the alkaloids contained in the starting material.

It is also possible to treat the organic extraction solution with an undiluted acid such as oxalic acid, in order to obtain the salts of all alkaloids present, which can then be isolated by filtration and purified.

The alkaloids are obtained from such salts in the form of the free bases by means of conventional techniques of neutralization and extraction wth an organic solvent. The average yields of said alkaloids are about 0.35% obtained from the leaves of the plant, 0.5% obtained from the stems, and 0.55% obtained from the roots. The alkaloids are obtained in the form of a semi-solid mass of light brown color.

By chromatographic adsorption of a benzene solution of the alkaloids on alumina and by elution by means of a more polar solvent, such as ether, alcohol or a chlorinated hydrocarbon, there is obtained the alkaloid which is hereinafter referred to as paravallarine.

On acidifying a solution of said paravallarine in an alcohol or in acetone with concentrated hydrochloric acid and then diluting the acidified solution with an ether, there is obtained a precipitate of paravallarine hydrochloride.

The following examples further illustrate the present invention.

*Example 1*

Extraction of all steroid alkaloids from the plant:

200 g. of a powder obtained from leaves of *Paravallaris microphylla* are triturated with 100 cc. of a 10% ammonia solution. The treated powder is continuously extracted with ether in an apparatus of the Soxhlet type. The ethereal solution is concentrated by distillation to 200 cc. and is stirred three times with 100 cc. of 5% hydrochloric acid solution and twice with 100 cc. of 1% hydrochloric acid solution. The combined acid solutions are washed with 200 cc. of ether and are rendered alkaline to a pH-value of 9.0 by adding ammonia. The precipitated alkaloids are extracted three times with methylene chloride using 200 cc. for each extraction. The combined methylene chloride solutions are washed with 200 cc. of water, dried over sodium sulfate, and evaporated to dryness; they yield all the alkaloids, which form a clear semi-solid brown mass weighing 770 mg. The yield is 0.35% of the weight of the starting leaves.

*Example 2*

Another method of extracting all the alkaloids:

200 g. of the powdered roots are triturated with 100 cc. of a 5% solution of sodium carbonate, are continuously extracted in the cold by leaching with methylene chloride until a test portion of the extract is free of alkaloid. The extract of a volume of one liter to three liters is concentrated by distillation to 200 cc. The solution is repeatedly stirred with a 5%, by weight, aqueous sulfuric acid solutions, namely three times with 200 cc. and twice with 100 cc.

The combined acid solutions are washed with benzene and are rendered alkaline by the addition of sodium carbonate to a pH-value of 9.0, whereby heating is avoided. The alkaloids which precipitate are extracted three times with 250 cc. of chloroform. The chloroform solutions are decanted, washed with 200 cc. of water, dried over calcium chloride, and distilled, thereby yielding all the alkaloids as a semi-solid mass weighing 1 g. Yield: 0.5%, based on the weight of the roots.

*Example 3*

Isolation of crystallized paravallarine:

5 g. of the total alkaloids obtained from the roots are dissolved in 250 cc. of benzene while boiling. The cooled and filtered solution is subjected to chromatographic adsorption by 150 g. of alumina of the activity 1.

After using 1 liter of benzene, elution is continued with 5 liters of pure diethyl ether and 5 liters of a mixture of 95 parts, by volume, of diethyl ether and 5 parts, by volume, of methanol.

The ether and ether-methanol solutions are evaporated to dryness and the residue is taken up in 25 cc. of boiling acetone. On cooling, the filtered acetone solution yields 850 mg. of pure paravallarine in the form of prismatic crystals.

*Example 4*

Preparation of paravallarine hydrochloride:

50 mg. of paravallarine are dissolved in 5 cc. of acetone. 0.1 cc. of concentrated hydrochloric acid (d. =1.19) and 100 cc. of diethyl ether are added to the solution. The paravallarine hydrochloride which precipitates in the form of needles is collected by filtration and washed with a cold mixture of 1 part, by volume, of acetone and 3 parts, by volume, of ether. Yield 96%.

The results of the analysis of the compound of the formula $C_{22}H_{33}O_2N.HCl$ are as follows:

Calculated: Percent $Cl=9.69$, $N=3.83$. Found: Percent $Cl=9.6$, $N=3.8$.

Other acid addition salts of paravallarine may be prepared in an analogous manner with other pharmaceutically acceptable acids, such as hydrobromic acid, hydroiodic acid, sulfuric acid, phosphoric acid, or other inorganic acids, or with organic acids such as acetic acid, formic acid, propionic acid, butyric acid, succinic acid, malonic acid, maleic acid, malic acid, citric acid, tartaric acid, benzoic acid, salicylic acid, phthalic acid, nicotinic acid, and others.

*Example 5*

Preparation of N-methyl paravallarine:

117 mg. of paravallarine are heated to 100° C. for 4 hours with 3 cc. of formic acid and 2 cc. of formaldehyde solution. By adding 50 cc. of cold water and a sufficient quantity of sodium hydroxide solution to yield a pH-value of 9.0, a precipitate is produced and is extracted three times with diethyl ether, each time with 250 cc. The ethereal solutions are combined, washed with water, dried over anhydrous sodium sulfate, and, evaporated to dryness. Yield: 130 mg. of crude N-methyl paravallarine, which is purified by recrystallization from acetone.

*Example 6*

Preparation of N-acetyl paravallarine:

100 mg. of paravallarine are heated to 100° C. for 5 hours with 8 cc. of acetic acid anhydride. Unreacted acetic acid anhydride is completely distilled off. The residue, on recrystallization from acetone, yields 88 mg. of N-acetyl paravallarine.

*Example 7*

Preparation of paravallarinol:

A solution of 100 mg. of paravallarine in 200 cc. of dry diethyl ether is heated under reflux for 4 hours with 100 mg. of lithium aluminum hydride. The following reagents are carefully added to the reaction solution in the order stated: 1 cc. of ethyl acetate, 25 cc. of water, a sufficient quantity of concentrated hydrochloric acid solution to lower the pH-value to a pH of 1.0, 10 g. of Seignette's salt, then 30% sodium hydroxide solution until the pH is 12.0, and finally 200 cc. of ether. The ethereal solution is decanted. The aqueous reaction solution is extracted twice with 200 cc. of ether. The ethereal solutions are combined, washed with water, dried, and evaporated to dryness. The residue weighs 101 mg. and is dissolved in 5 cc. of boiling acetone. It yields 55 mg. of crystallized paravallarinol.

Example 8

Preparation of triacetyl paravallarinol:

140 mg. of paravallarinol are heated at 100° C. with 5 cc. of acetic acid anhydride for 2 hours. Excess acetic acid anhydride is distilled off in a vacuum. The residue is dissolved in 3 cc. of diethyl ether. This solution, after addition of 5 cc. of hexane, yields 72 mg. of crystallized triacetyl paravallarinol after 48 hours.

Example 9

Preparation of the methyl ester of N-acetyl paravallaric acid:

128 mg. of N-acetyl paravallarine are dissolved in 20 cc. of 96% ethanol containing 2.2 g. of potassium hydroxide. The solution is heated under reflux for 6 hours, diluted with 90 cc. of water and a sufficient quantity of acetic acid to give a pH-value of 4.0, and successively extracted three times with chloroform, each time with 200 cc. The resulting chlorofrom extract is washed with water, dried over dry sodium sulfate, and evaporated to dryness. It yields crude N-acetyl paravallaric acid, which is purified by washing with 10 cc. of cold methanol. 93 mg. of N-acetyl paravallaric acid are obtained and are stirred with 100 cc. of ether containing 1.5 g. of diazomethane for 2 hours. The resulting clear solution, to which 1 cc. of acetic acid is added, is evaporated to dryness. The residue is dissolved in 2 cc. of hot acetone. The acetone solution is mixed with 5 cc. of hexane and yields 68 mg. of the crystallized methyl ester of N-acetyl paravallaric acid which is separated from the mother liquor by filtration.

Example 10

This example illustrates the preparation of a dihydrogenated derivative of paravallarine.

200 mg. of paravallarine are dissolved in 15 cc. of glacial acetic acid and stirred in a hydrogen atmosphere at atmospheric pressure and room temperature in the presence of 100 mg. of 30% palladium black. The acetic acid solution is filtered to remove the catalyst and the solution is poured into ice water. The solution is finally rendered alkaline by the addition of ammonia.

The precipitated product is extracted with 200 cc. of ether and the ethereal solution is washed with water. It is dried over anhydrous sodium sulfate and evaporated to dryness. 192 mg. of a residue are obtained which, on recrystallization from ether, yield 166 mg. of dihydroparavallarine or (20 S)-3β-(N-methylamino)-20-hydroxy-18-oic lactone (→20)-allopregnane. This compound corresponds to the following formula:

It melts at 166° C. and its specific rotation is $[\alpha]_D^{20} = -5° \pm 2°$ (concentration: 0.7% in chloroform).

Figure 11:
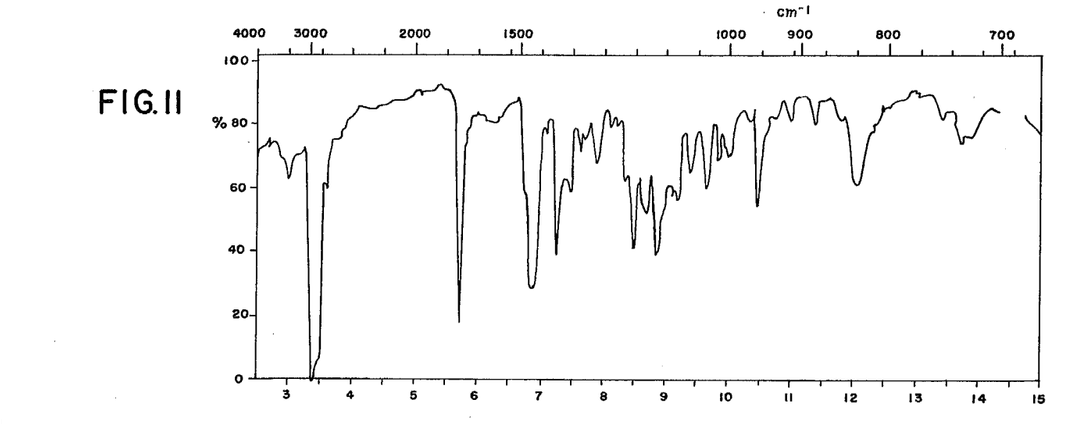

The infra-red spectrum of this product is given in FIG. 11. An NH-band is observed at 3μ and a lactone band at 5.72μ.

The results of the analysis of the compound of the empirical formula $C_{22}H_{35}O_2N$ are as follows:

Calculated: Percent C=76.47, H=10.21. Found: Percent C=76.53, H=10.15.

Example 11

Another method of preparing dihydroparavallarine.

100 mg. of platinum oxide are reduced to metallic platinum by stirring in a hydrogen atmosphere in 15 cc. of glacial acetic acid at atmospheric pressure and room temperature. 194 mg. of paravallarine are introduced into the reaction medium and hydrogenation is carried out under the same temperature and pressure conditions as above. After 4 hours, hydrogenation is completed and the volume of hydrogen absorbed is 13.0 cc. whereas a calculated volume of 12.7 cc. is required for hydrogenation of the double bond.

After removal of the catalyst, the reaction product is extracted as described in Example 10. It was found that the recovered compound is identical with the dihydroparavallarine characterized above.

Example 12

250 mg. of dihydroparavallarine are heated to 100° C. with 8 cc. of acetic acid anhydride for 3 hours. After eliminating excess acetic acid anhydride by vacuum distillation, the residue is recrystallized twice from acetone. 208 mg. of N-acetyl dihydroparavallarine are obtained Melting point: 258–259° C.; optical rotation $[\alpha]_D = 14°$ (concentration: 0.28% in chloroform).

Analysis for $C_{24}H_{37}O_3N$—Calculated: 74.38% C; 9.62% H; 12.39% O. Found: 74.59% C; 9.62% H; 12.51% O.

Figure 12:
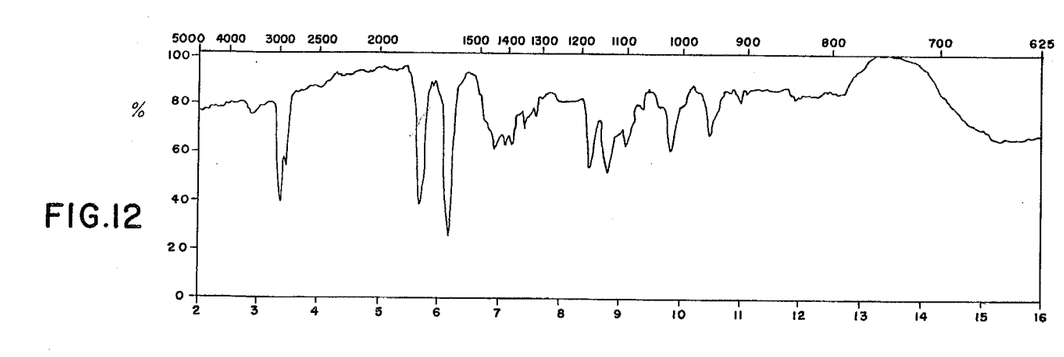

The infra-red spectrum of the resulting N-acetyl dihydroparavallarine is given in FIG. 12 of the drawings.

Example 13

200 mg. of dihydroparavallarine are heated to 100° C. with 3 cc. of 30% formaldehyde solution and 4 cc. of formic acid for 6 hours. The reaction solution is diluted with 100 g. of ice and is rendered alkaline to a pH-value of 13 by the addition of sodium hydroxide solution. The resulting precipitate is extracted by means of 200 cc. of ether. The ethereal solution is decanted, washed with water, dried over sodium sulfate, and distilled, whereby a residue of 209 mg. remains, which yields 92 mg. of N-methyl dihydroparavallarine by crystallization from acetone and hexane and recrystallization from ether. Melting point: 148° C.; optical rotation $[\alpha]_D^{20} = 22°$ (concentration: 0.30% in chloroform).

Analysis for $C_{23}H_{37}O_2N$—Calculated: 76.83% C; 10.37% H; 8.90% O. Found: 76.89% C; 10.28% H; 8.98% O.

Figure 13:
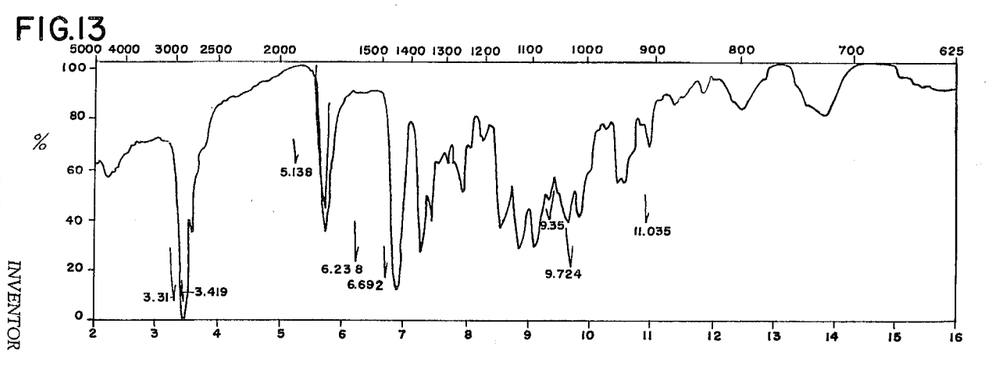

The infra-red spectrum of N-methyl dihydroparavallarine is given in FIG. 13.

Example 14

The solution of 200 mg. of N-acetyl dihydroparavallarine in 2 cc. of tetrahydrofuran and 20 cc. of anhydrous ether is heated under reflux with 200 mg. of lithium aluminum hydride ($LiAlH_4$) for 6 hours. Successively 25 cc. of ether saturated with water, 1 cc. of methanol, and then 100 cc. of water, followed by a sufficient quantity of hydrochloric acid are added to the resulting solution yield a pH of 1.0. The organic solvents are removed by distillation and 20 g. of sodium potassium tartrate and sodium hydroxide solution are added to the aqueous solution in order to adjust the pH-value to a pH of 13.0. The precipitate is extracted with 250 cc. of chloroform. The decanted chloroform solution is washed with water and dried over sodium sulfate on distillation, a residue of 175 mg. remains which yields on crystallization from acetone and methanol 122 mg. of N-ethyl dihydroparavallarinol. Melting point: 212° C.; optical rotation $[\alpha]_D^{20} = 23.4°$ (concentration: 0.26% in chloroform).

Analysis for $C_{24}H_{32}O_2N$—Calculated: 76.34% C; 11.48% H. Found: 76.17% C; 11.28% H.

Figure 14:
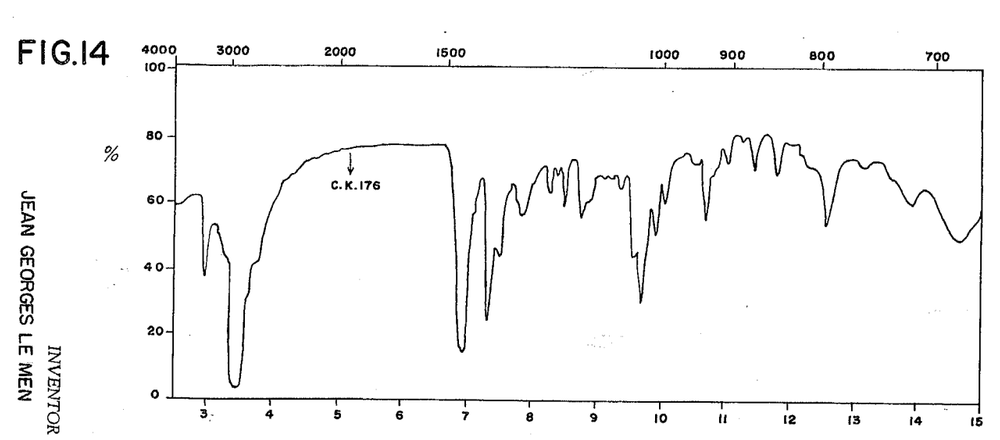

The infra-red spectrum of N-ethyl dihydroparavallarinol is given in FIG. 14 of the accompanying drawings.

Other acyl derivatives of the above mentioned paravallarine, paravallarinol, paravallaric acid, and dihydroparavallarine are prepared in an analogous manner as described hereinabove for the preparation of N-acetyl compounds. The following table illustrates the preparation of such other acyl derivatives without, however, limiting the same thereto:

| Example No. | Starting material | Acylating agent | N-acyl derivative compound obtained |
|---|---|---|---|
| 15 | Paravallarine | Propionic acid anhydride. | N-propionyl paravallarine. |
| 16 | ----do---- | n-Butyroyl chloride. | N-(n-butyroyl) paravallarine. |
| 17 | ----do---- | Cyclopentyl propionyl chloride. | N-cyclopentyl propionyl paravallarine. |
| 18 | ----do---- | Benzoyl chloride. | N-benzoyl paravallarine. |
| 19 | ----do---- | Stearoyl chloride. | N-stearoyl paravallarine. |
| 20 | ----do---- | Hexahydrobenzoyl chloride. | N-hexahydrobenzoyl paravallarine. |
| 21 | ----do---- | Caproyl chloride. | N-caproyl paravallarine. |
| 22 | ----do---- | Enanthoyl chloride. | N-enanthoyl paravallarine. |
| 23 | Dihydroparavallarine. | Propionic acid anhydride. | N-propionyl dihydroparavallarine. |
| 24 | ----do---- | Isovaleric acid chloride. | N-isovaleroyl dihydroparavallarine. |
| 25 | ----do---- | Cyclohexyl acetyl chloride. | N-cyclohexyl acetyl dihydroparavallarine. |
| 26 | ----do---- | Phenyl acetyl chloride. | N-phenyl acetyl dihydroparavallarine. |
| 27 | ----do---- | Benzoylchloride. | N-benzoyl dihydroparavallarine. |
| 28 | ----do---- | Palmitoyl chloride. | N-palmitoyl dihydroparavallarine. |

In an analogous manner as described in Example 8 there are obtained other triacylated paravallarinol compounds such as the tripropionyl paravallarinol, the tribenzoyl paravallarinol, and others.

When using the above mentioned N-acylated paravallarine compounds and splitting up the lactone ring as described in Example 9, the corresponding N-acylated paravallaric acid compounds are obtained. They can be converted into their methyl esters by means of diazomethane by proceeding according to Example 9. By esterification by means of other esterifying agents such as diazo ethane and others, there are obtained other esters of N-acylated paravallaric acid such as the ethyl ester and the like.

Other N-alkyl, aryl, cycloalkyl, aralkyl substituted paravallarine and dihydroparavallarine compounds can be obtained by preparing first the corresponding N-acyl paravallarine or dihydroparavallarine compounds and then hydrogenating the carbonyl group by means of lithium aluminum hydride as described in Example 14. Thus by hydrogenating, for instance, N-propionyl, N-benzoyl, N-hexahydrobenzoyl, N-cyclopentyl propionyl, N-phenyl acetyl paravallarine by means of lithium aluminum hydride, there are obtained the corresponding N-propyl, N-benzyl, N-hexahydrobenzyl, N-cyclopentyl propyl, N-(β-phenyl) ethyl paravallarine compounds. Likewise, when first preparing the corresponding N-acylated dihydro paravallarine compounds and subjecting them to the action of lithium aluminum hydride, there are obtained the corresponding N-hydrocarbon-substituted dihydroparavallarine compounds.

It is evident from the foregoing description of the present invention that the basic steroid compounds which can be obtained according to the present invention are compounds of the following Formula V

V wherein

R is hydrogen, a hydrocarbon radical such as an alkyl, cycloalkyl, aryl, or aralkyl radical and preferably lower alkyl or benzyl or an acyl group and preferably a lower alkanoyl group or the benzoyl group;

X is methylene-$CH_2$— or the carbonyl group —CO—;

Y and Z are hydrogen or a direct carbon to carbon bond thus forming a double bond between the carbon atoms 5 and 6;

$R_1$ is hydrogen, a hydrocarbon radical and preferably lower alkyl, when X is the carbonyl group, and an acyl group, preferably a lower alkanoyl group or the benzoyl group when X is methylene; and $R_2$ is the hydroxyl group, an acyl group and preferably a lower alkanoyl group or the benzoyl group, or, together with $R_1$, forming a direct bond between the oxygen atom to which $R_1$ is attached, and the carbon atom to which $R_2$ is attached.

Of course, many changes and variations in the reactants, the reaction conditions, temperature, and duration, the solvents used, the methods of working up the reaction mixtures and of isolating and purifying the reaction products, and the like may be made by those skilled in the art in accordance with the principles set forth herein and in the claims annexed hereto.

I claim:

1. (20 S)-3β-(N-methylamino)-20-hydroxy-18-oic lactone (→20)-pregna-5-ene.
2. (20 S)-3β-(N-dimethylamino) - 20 - hydroxy-18-oic lactone (→20)-pregna-5-ene.
3. (20 S)-3β-(N-methyl-N-acetylamino)-20 - hydroxy-18-oic lactone (→20)-pregna-5-ene.
4. The hydrochloride of (20 S)-3β-(N-methylamino)-20-hydroxy-18-oic lactone (→20)-pregna-5-ene.
5. (20 S)-3β-(N-methylamino)-18,20-dihydroxy-pregna-5-ene.
6. (20 S)-3β-(N-methyl-N-acetylamino) - 18,20-diacetoxy-pregna-5-ene.
7. (20 S)-3β-(N-methyl-N-acetylamino-13-carboxy-20-hydroxy-pregna-5-ene.
8. (20 S)-3β-(N-methyl - N - acetylamino) - 13 - carbomethoxy-20-hydroxy-pregna-5-ene.
9. (20 S)-3β-(N-dimethylamino) - 18,20 - dihydroxy-pregna-5-ene.
10. (20 S)-3β-(N-dimethylamino) - 18,20 - diacetoxy-pregna-5-ene.
11. (20 S)-3β-(N-methylamino)-20-hydroxy-18-oic lactone (→20)-allopregnane of the formula 12. The basic steroid compounds selected from the group consisting of steroid compounds of the formula wherein R is a substituent selected from the group consisting of hydrogen, alkyl with 1 to 18 carbon atoms, phenyl lower alkyl, cyclopentyl lower alkyl, and cyclohexyl lower alkyl, and alkanoyl with 1 to 18 carbon atoms, cyclopentyl lower alkanoyl, cyclohexyl lower alkanoyl, benzoyl, hexahydrobenzoyl, and phenyl lower alkanoyl;

X is a member selected from the group consisting of the methylene group and the carbonyl group;

Y and Z are members selected from the group consisting of hydrogen and a direct carbon to carbon bond;

$R_1$ is a member selected from the group consisting of hydrogen, alkyl with 1 to 18 carbon atoms, phenyl lower alkyl, cyclopentyl lower alkyl, and cyclohexyl lower alkyl, alkanoyl with 1 to 18 carbon atoms, cyclopentyl lower alkanoyl, cyclohexyl lower alkanoyl, benzoyl, hexahydrobenzoyl, and phenyl lower alkanoyl;

$R_2$ is a member selected from the group consisting of hydroxyl, alkanoyloxy with 1 to 18 carbon atoms, cyclopentyl lower alkanoyloxy, cyclohexyl lower alkanoyloxy, benzoyloxy, hexahydrobenzoyloxy, and phenyl lower alkanoyloxy; and $R_2$ together with $R_1$ forming a direct bond to complete a 5-membered ring, when X is the carbonyl group;

and their acid addition salts.

13. (20 S) - 3β-(N-methyl-N-ethylamino) - 18,20-dihydroxy-5α-pregnane.

14. (20 S)-3β-(N-methyl-N-acetylamino)-20-hydroxy-18-oic lactone (→20)-5α-pregnane.

15. (20 S) - 3β-(N-dimethylamino)-20-hydroxy-18-oic-lactone (→20)-5α-pregnane.

16. A process of preparing steroid alkaloids, which process comprises crushing parts of the plant *Paravallaris microphylla* Pitard, treating the resulting powder with an alkaline agent selected from the group consisting of an alkali metal carbonate, an alkali metal bicarbonate, and ammonia at a pH exceeding 7.0 and lower than 12.0, extracting the product obtained thereby with a non-alcoholic organic solvent which is immiscible with water, said solvent being selected from the group consisting of hydrocarbons, aliphatic ethers, and chlorinated aliphatic hydrocarbons, decreasing the pH-value of the extract to a pH between about 2.0 and about 7.0 by the addition of an aqueous acid solution to re-establish an acid aqueous phase, separating said acid aqueous phase from the solvent phase, and treating the separated acid aqueous phase with an alkaline agent selected from the group consisting of an alkali metal carbonate, an alkali metal bicarbonate, and ammonia to increase the pH-value to a pH exceeding 7.0 and lower than 12.0 and to precipitate the steroid alkaloids.

17. A process according to claim 16, wherein the resulting precipitate is filtered off.

18. A process according to claim 16, wherein the resulting precipitate is extracted with a non-alcoholic organic solvent which is immiscible with water, said solvent being selected from the group consisting of hydrocarbons, aliphatic ethers, and chlorinated aliphatic hydrocarbons, and the extract is washed, dried, and distilled.

19. A process of producing an acid addition salt of a steroid alkaloid, which process comprises crushing parts of the plant *Paravallaris microphylla* Pitard, treating the resulting powder with an alkaline agent selected from the group consisting of an alkali metal carbonate, an alkali metal bicarbonate, and ammonia at a pH exceeding 7.0 and lower than 12.0, extracting the product obtained thereby with a non-alcoholic organic solvent which is immiscible with water said solvent being selected from the group consisting of hydrocarbons, aliphatic ethers, and chlorinated aliphatic hydrocarbons, separating the organic solvent phase, treating said phase with an acid to form the acid addition salt of the steroid alkaloid, and separating said salt by filtration.

20. A process according to claim 19, wherein the acid addition salt is dissolved in benzene, passing the solution through chromatographic alumina, eluting the alumina with a solvent of greater polarity than benzene, said solvent being selected from the group consisting of ether, alcohol, and a chlorinated hydrocarbon and causing the acid addition salt to crystallize.

21. A process according to claim 19, wherein the acid addition salt is catalytically hydrogenated by means of hydrogen and a finely divided noble metal selected from the group consisting of platinum and palladium.

22. A process of producing a steroid alkaloid, which process comprises crushing parts of the plant *Paravallaris microphylla* Pitard, treating the resulting powder with an alkaline agent selected from the group consisting of an alkali metal carbonate, and alkali metal bicarbonate, and ammonia at a pH exceeding 7.0 and lower than 12.0, extracting the product obtained thereby with a non-alcoholic organic solvent which is immiscible with water, said solvent being selected from the group consisting of hydrocarbons, aliphatic ethers, and chlorinated aliphatic hydrocarbons, decreasing the pH-value of the extract to a pH between about 2.0 and about 7.0 by the addition of an aqueous acid solution to re-establish an acid aqueous phase, separating said acid aqueous phase from the solvent phase, treating the separated acid aqueous phase with an alkaline agent selected from the group consisting of an alkali metal carbonate, and alkali metal bicarbonate, and ammonia to increase the pH-value to a pH exceeding 7.0 and lower than 12.0, separating the precipitate, dissolving the precipitate in benzene, passing the benzene solution through chromatographic alumina, eluting the alumina with a solvent of greater polarity than benzene, said solvent being selected from the group consisting of ether, alcohol, and a chlorinated hydrocarbon and causing the steroid alkaloid to crystallize.

23. A process of preparing a steroid alkaloid, which process comprises crushing parts of the plant *Paravallaris microphylla* Pitard, treating the resulting powder with an alkaline agent selected from the group consisting of an alkali metal carbonate, an alkali metal bicarbonate, and ammonia at a pH exceeding 7.0 and lower than 12.0, extracting the product obtained thereby with a non-alcoholic organic solvent which is immiscible with water, said solvent being selected from the group consisting of hydrocarbons, aliphatic ethers, and chlorinated aliphatic hydrocarbons decreasing the pH-value of the extract to a pH between about 2.0 and about 7.0 by the addition of an aqueous acid solution to re-establish an acid aqueous phase, separating said acid aqueous phase from the solvent phase, treating the separated acid aqueous phase with an alkaline agent selected from the group consisting of an alkali metal carbonate, an alkali metal bicarbonate, and ammonia to increase the pH-value to a pH exceeding 7.0, separating the precipitate, dissolving the precipitate in benzene, passing the benzene solution through chromatographic alumina, eluting the alumina with a solvent of greater polarity than benzene, said solvent being selected from the group consisting of ether, alcohol, and a chrorinated hydrocarbon causing the steroid alkaloid to crystallize, and catalytically hydrogenating said alkaloid by means of hydrogen and a finely divided noble metal selected from the group consisting of platinum and palladium.

24. A process of preparing a steroid alkaloid, which process comprises crushing parts of the plant *Paravallaris microphylla* Pitard, treating the resulting powder with an alkaline agent selected from the group consisting of an alkali metal carbonate, an alkali metal bicarbonate, and ammonia at a pH exceeding 7.0 and lower than 12.0, extracting the product obtained thereby with a non-alcoholic organic solvent which is immiscible with water, said solvent being selected from the group consisting of hydrocarbons, aliphatic ethers, and chlorinated aliphatic hydrocarbons, decreasing the pH-value of the extract to a pH between about 2.0 and about 7.0 by the addition of an aqueous acid solution to re-establish an acid aqueous phase, separating said acid aqueous phase from the solvent phase, treating the separated acid aqueous phase with an alkaline agent selected from the group consisting of an alkali metal carbonate, an alkali metal bicarbonate, and ammonia to increase the pH-value to a pH exceeding 7.0 and lower than 12.0, separating the precipitate, dissolving the precipitate in benzene, passing the benzene solution through chromatographic alumina, eluting the alumina with a solvent of greater polarity than benzene, said solvent being selected from the group consisting of ether, alcohol, and a chlorinated hydrocarbon causing the steroid alkaloid to crystallize, dissolving the alkaloid in acetic acid, and catalytically hydrogenating the same by means of hydrogen and a finely divided noble metal selected from the group consisting of platinum and palladium.

No References Cited.

LEWIS GOTTS, *Primary Examiner*.

IRVING MARCUS, *Examiner*.